P. EVANS.
UNIVERSAL JOINT.
APPLICATION FILED APR. 7, 1916.
1,231,722.
Patented July 3, 1917.
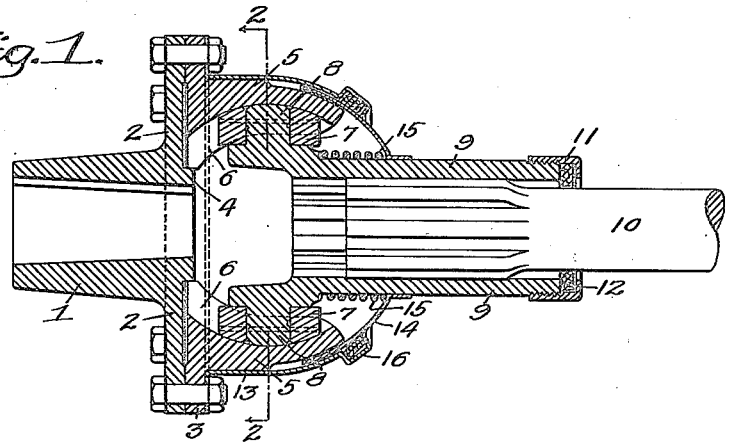
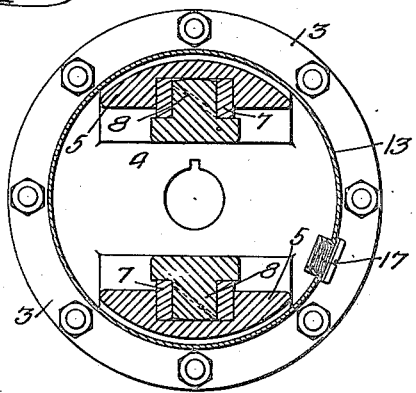
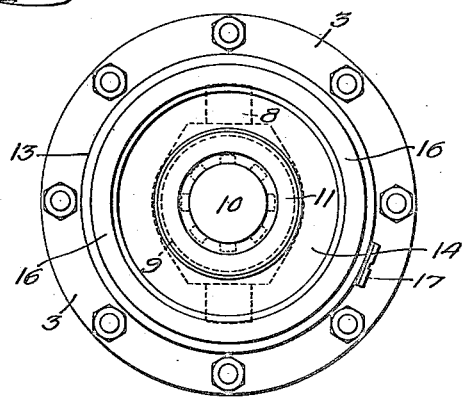
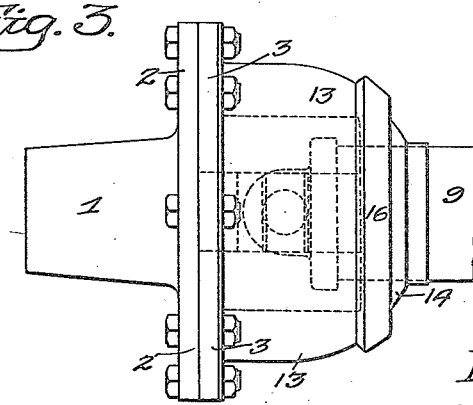
Inventor.
Powell Evans
by his Attorney

UNITED STATES PATENT OFFICE.

POWELL EVANS, OF PHILADELPHIA, PENNSYLVANIA.

UNIVERSAL JOINT.

1,231,722.   Specification of Letters Patent.   Patented July 3, 1917.

Application filed April 7, 1916. Serial No. 89,613.

*To all whom it may concern:*

Be it known that I, POWELL EVANS, a citizen of the United States, residing in Philadelphia, Pennsylvania, have invented a Universal Joint, of which the following is a specification.

One object of my invention is to provide a substantial, reliable and relatively simple form of universal joint which shall be efficient and not likely to require more than a minimum of attention or repair, the invention particularly contemplating an arrangement of parts capable of withstanding hard usage and easily dis-assembled.

It is further desired to provide a universal joint having the above characteristics which shall be compact and of such a nature as to permit of its being readily inclosed for the purpose of retaining lubricant and preventing entrance of objectionable material, one feature of the invention consisting of the novel means whereby such inclosure is made possible.

These objects and other advantageous ends I secure as hereinafter set forth, reference being had to the accompanying drawings, in which, Figure 1 is a longitudinal vertical section of a universal joint constructed according to my invention;

Fig. 2 is a transverse section on the line 2—2, of the device shown in Fig. 1;

Fig. 3 is a plan; and

Fig. 4 is an end elevation.

In the above drawings 1 represents a sleeve having a flange 2 designed to fit against one face of a flange 3 to which it is detachably secured by any suitable means such as bolts and in which it is centered by a circular projecting portion 4. Extending from the opposite or outer face of the flange 3 are a pair of oppositely placed cheek pieces 5 having the portions of their external surface adjacent the flange cylindrical and the remainder of said surface of spherical form, while their inner faces are recessed to provide circularly curved guideways 6 for a pair of blocks or shoes 7. These latter while being of substantially rectangular cross section, have one face plane and the opposite face cylindrically curved to fit the correspondingly curved bottoms of their guideways. The blocks 7 are perforated to provide bearings for a pair of trunnions 8 projecting from opposite sides of the extremity or head of a second sleeve 9, the arrangement being such that the longitudinal axis of the cylindrical surfaces forming the bottoms of the guides, passes through the longitudinal axes of the two sleeves or shaft members 1 and 9 at the point at which these axes are intersected by the center line of the trunnions.

The sleeve 9 is provided with a longitudinal passage of substantially circular section provided with keyways for the reception of a shaft 10 and is threaded at its outer end for the reception of an inwardly flanged cap 11. This latter holds a body of packing 12 against the end of the sleeve and insures an oil and dust tight joint between the latter and the shaft. Since the inwardly extending flange of the cap 11 may not closely fit the shaft 10, I mount between it and the surface of the packing a split washer which closely engages said shaft and is held against the packing by the cap.

The body of the universal joint is inclosed by a metal casing consisting of two parts 13 and 14, of which the latter fits inside of the former and has a limited sliding and rotary movement relative thereto. Of these elements the first is provided with a flange extending over the flange 3 so as to be rigidly held in place by the bolts which couple said flange to the flange 2, and the casing part 14 is closely fitted to the sleeve 9 so as to be free to slide longitudinally thereof, being held in engagement with the inner surface of the element 13 by a spring 15 mounted between it and the head of the sleeve 9. The outer edge of the casing element 13 is shaped by any suitable means to have an annular troughlike portion 16 opening upon the outer surface of the casing element 14 and designed for the reception of a body of packing, which while slidably engaging said latter casing section, insures the retention within the universal joint, of the body of lubricant which is conveniently introduced through an opening formed in one side of the casing part 13 and normally closed by a plug 17.

Suitable oil grooves may be provided in the trunnions 8, and under conditions of operation it is obvious either of the members 1 or 9 may be driven and the other caused to transmit power to a machine or device, it being obvious that if the longitudinal axis of the shaft 10 and of a second shaft connected to the sleeve 1, should be out of line, the sleeve 9 could turn on its trunnions 8 in the blocks 7 and these latter in turn could slide in the guides 6 in the manner necessary to permit of the free rotation of the driving and driven shafts.

It is noted that the guides 6 open on the flat surface of the flange 3 and are of such dimensions that when it is desired to disassemble the device, said flange is separated from the flange 2 and after the shaft 10 has been removed from the sleeve 9 the latter may be turned on its trunnions through an angle of 90° so that its longitudinal axis substantially coincides with the axis of the cylindrical surface including the curved bottoms of said guides. Thereafter if said sleeve 9 be turned on its longitudinal axis through 90°, the two blocks 7 will slide out of their guides, thus permitting them with the sleeve to be removed from the structure 3—5;—it being understood that the casing 13—14 is in a loose condition which permits of such movement.

I claim:—

1. The combination of a shaft-engaging sleeve having a flange; an annular flange detachably fixed to the flange of said sleeve and having projecting cheek pieces formed with circularly curved portions; blocks slidable on said portions; and a second shaft-engaging sleeve having trunnions rotatably engaging said blocks respectively.

2. The combination of a shaft-engaging sleeve having an outwardly projecting flange and a circular projecting portion on the outer face of said flange; an annular flange having an opening fitting said circular projecting portion and including projecting cheek pieces formed with circularly curved guide-ways; means for connecting said flanges; blocks slidable in the guide-ways; and a second shaft-engaging sleeve rotatably engaging said blocks.

3. The combination of a shaft-engaging sleeve; cheek pieces having circularly curved guideways; blocks slidable in said guide-ways; a second sleeve rotatably engaging said blocks; a casing made in two parts of which one is mounted on the second sleeve; with bolts holding the cheek pieces and the second part of the casing to the first sleeve.

4. The combination in a universal joint of a flanged sleeve; an annular structure having cheek pieces provided with guide-ways and detachably engaging the flange of said sleeve; blocks slidable in said guide-ways about a common center; and a second sleeve having trunnions rotatably engaging said blocks, said annular structure having an opening normally closed by the flanged sleeve, through which one of the blocks may be removed after the second sleeve has been turned in two planes at right angles to each other.

POWELL EVANS.